United States Patent
Kishima (10) Patent No.: US 7,380,829 B2
(45) Date of Patent: Jun. 3, 2008

(54) FRONT BODY STRUCTURE OF VEHICLE (75) Inventor: Fumihiko Kishima, Kounan (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 332 days.

(21) Appl. No.: 10/537,807

(22) PCT Filed: Dec. 10, 2003

(86) PCT No.: PCT/JP03/15806

§ 371 (c)(1),
(2), (4) Date: Jun. 7, 2005

(87) PCT Pub. No.: WO2004/058559

PCT Pub. Date: Jul. 15, 2004

(65) Prior Publication Data

US 2006/0113784 A1 Jun. 1, 2006

(30) Foreign Application Priority Data

Dec. 26, 2002 (JP) ............................. 2002-376242

(51) Int. Cl.
B62D 21/00 (2006.01)
(52) U.S. Cl. ............... 280/781; 180/232; 296/187.03
(58) Field of Classification Search ............... 180/232, 180/299, 312; 280/781, 784, 124.109; 296/187.12, 296/187.03, 204
See application file for complete search history.

(56) References Cited

U.S. PATENT DOCUMENTS 5,042,837 A * 8/1991 Kleinschmit et al. ....... 280/784
5,611,568 A * 3/1997 Masuda ....................... 280/784
6,109,654 A * 8/2000 Yamamoto et al. ......... 280/784
6,390,224 B1 * 5/2002 Yoshida ....................... 180/312
6,722,696 B2 * 4/2004 Sonomura et al. .......... 280/784
6,742,808 B1 * 6/2004 Kosak ........................ 280/781
6,869,090 B2 * 3/2005 Tatsumi et al. ....... 280/124.109
6,957,846 B2 * 10/2005 Saeki ....................... 296/187.1
7,144,039 B2 * 12/2006 Kawasaki et al. ........... 280/784
2003/0011184 A1 * 1/2003 Sonomura et al. .......... 280/784
2003/0094803 A1 * 5/2003 Fujiki et al. ................ 280/784
2005/0218645 A1 * 10/2005 Shinta et al. ............... 280/784
2006/0082124 A1 * 4/2006 Kosaka ....................... 280/784

FOREIGN PATENT DOCUMENTS

| JP | A 11-171046 | 6/1999 |
| JP | A 11-198854 | 7/1999 |
| JP | A 2002-240739 | 8/2002 |

* cited by examiner

Primary Examiner—Toan To
(74) Attorney, Agent, or Firm—Oliff & Berridge, PLC (57) ABSTRACT In a front body structure of a vehicle according to the present invention, satisfactory impact absorption can be achieved both at the time of offset collision and at the time of full-lapped collision. When a load applied to an offset-collided front side member from a front side of the vehicle is equal to or more than a predetermined value, the collided front side member is deformed. Thus, a front suspension member rotates. As a result, a bolt passing through the front suspension member fits into a branch of a slit of a rear mounting bracket disposed on the collided front side member, and the state in which the collided front side member is fixed to the front suspension member is maintained.

9 Claims, 10 Drawing Sheets

FRONT BODY STRUCTURE OF VEHICLE

TECHNICAL FIELD

The present invention relates to a front body structure of a vehicle, and specifically to a front body structure of a vehicle for reducing the impact acting on occupants at the time when the vehicle such as an automobile comes into frontal collision.

BACKGROUND ART

Conventionally, in a front body structure of a vehicle for reducing the impact acting on occupants at the time when the vehicle such as an automobile comes into frontal collision, a front sub-frame is supported by bolts to brackets which are fixed to a main frame and in which rear-end opening slits are formed, and the bolts on the rear side slip from the rear-end openings of the slits at the time of frontal collision. Accordingly, the main frame can be crushed without the interruption of the front sub-frame. This structure is disclosed in, for example, Japanese Patent Application Laid-Open (JP-A) No. 11-171046.

Further, in another front body structure of a vehicle for reducing the impact acting on occupants at the time when the vehicle such as an automobile comes into frontal collision, a front cross member extending on a front edge of the vehicle along the transverse direction thereof is divided at a substantially central portion of the front cross member into right and left two cross members, and a compass mechanism for symmetrically restricting the rotational movement of the right and left cross members with the respective substantially central portions thereof being as a rotational center is provided at a connecting portion between the right and left cross members. This structure is disclosed in, for example, JP-A No. 11-198854.

However, in the structure of JP-A No. 11-171046, even when the vehicle comes into offset collision, the right and left bolts on the rear side slip from the rear-end openings of the slits, and the impact is absorbed only by the collided front side member. Therefore, the amount of impact absorption in the case of offset collision is less than that in the case of full-lapped collision (full collision), and satisfactory impact absorption cannot be achieved. Further, in the structure of JP-A No. 11-198854, the satisfactory impact absorption is limited by the problem of strength of the compass mechanism against a large collision load.

DISCLOSURE OF THE INVENTION

In view of the above facts, an object of the present invention is to obtain a front body structure of a vehicle, in which satisfactory impact absorption can be achieved both at the time of offset collision and at the time of full-lapped collision.

In order to solve the above problems, the front body structure of a vehicle according to the present invention comprises: a pair of right and left front side members disposed at a front portion of a vehicle body along a longitudinal direction of the vehicle body; a connecting member including front ends and rear ends in a transverse direction of the vehicle, the front ends and the rear ends being respectively fixed to front fixing portions and rear fixing portions of the pair of right and left front side members; and fixing mechanisms disposed on the right and left rear fixing portions, the fixing mechanisms releasing, when a load applied to the front side members from a front side of the vehicle is equal to or more than a predetermined value at a time of full-lapped collision, a state in which the front side members are fixed to the connecting member, and maintaining, at a time of offset collision, a state in which the collided front side member is fixed to the connecting member.

When the vehicle comes into full-lapped collision, the state in which the front side members are fixed to the connecting member is released by the fixing mechanisms disposed at the rear fixing portions of the front side members and the connecting member. As a result, the right and left front side members receive the load and are deformed so that the impact can be absorbed.

On the other hand, when the vehicle comes into offset collision, the state in which the collided front side member is fixed to the connecting member is maintained by the fixing mechanism disposed at the rear fixing portions of the collided front side member and the connecting member. As a result, the collided front side member receives a part of the load and is deformed so that the impact can be absorbed, and the fixing mechanism also receives a part of the load and is deformed so that the impact can be absorbed. Further, the other front side member also receives a part of the load via the fixing mechanism and is deformed so that the impact can be absorbed.

As a result, even in the case of offset collision, substantially the same impact absorption effect as in the case of full-lapped collision can be obtained, and satisfactory impact absorption can be thus achieved both at the time of offset collision and at the time of full-lapped collision.

Further, in the front body structure of a vehicle according to the present invention, the connecting member may be a front suspension member.

Accordingly, since the front suspension member can be used as the connecting member, there is no need to provide a particular connecting member and the structure is thus simplified.

MOST PREFERRED EMBODIMENTS FOR IMPLEMENTING THE INVENTION

An embodiment of a front body structure of a vehicle according to the present invention will be described with reference to FIGS. 1 to 8.

In these figures, Arrows FR indicate the front direction of the vehicle, and Arrows UP indicate the upper direction thereof.

Figure 1:
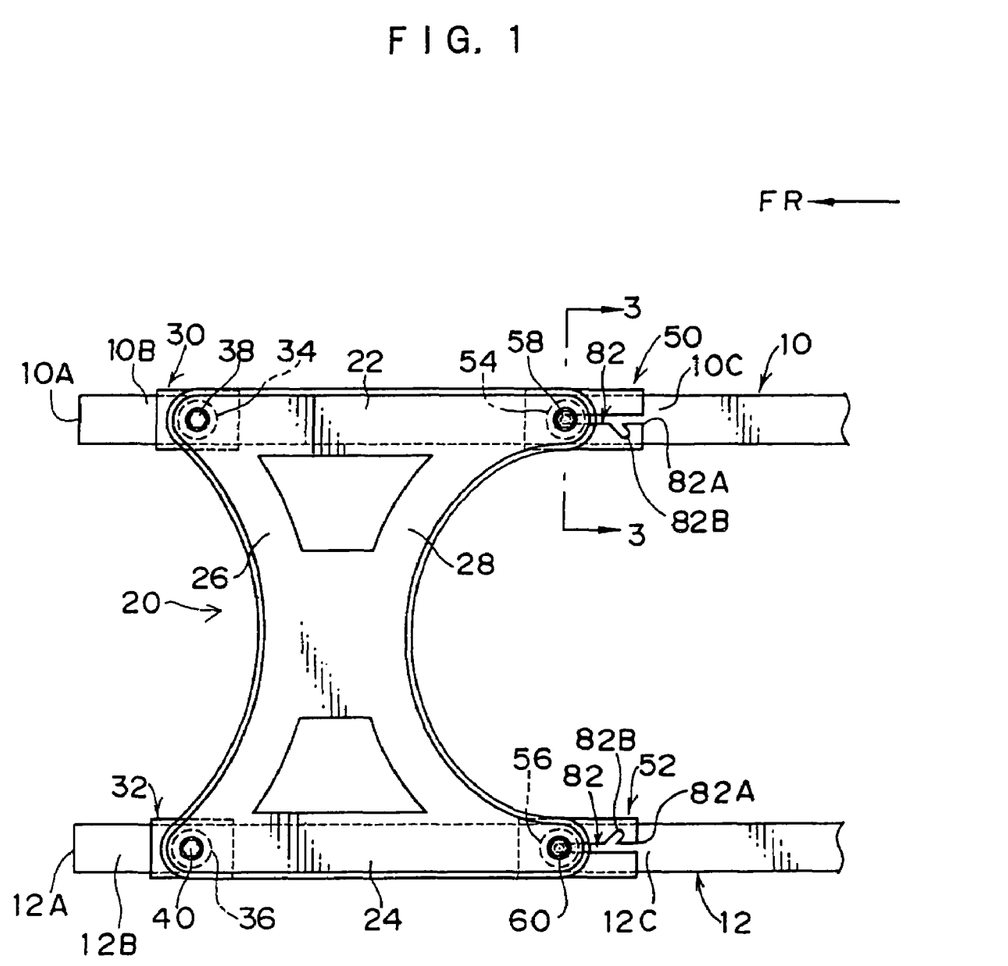
FIG. 1 is a plan view showing a front body structure of a vehicle, according to an embodiment of the present invention, seen from a lower side of the vehicle.

As shown in FIG. 1, in this embodiment, a pair of right and left front side members 10, 12 are disposed at a front portion of a vehicle body along the longitudinal direction thereof. A front bumper (not shown) is suspended between front ends 10A, 12A of the front side members 10, 12. Further, a front suspension member 20 serving as a connecting member is suspended between front portions of the pair of right and left front side members 10, 12.

Figure 2:
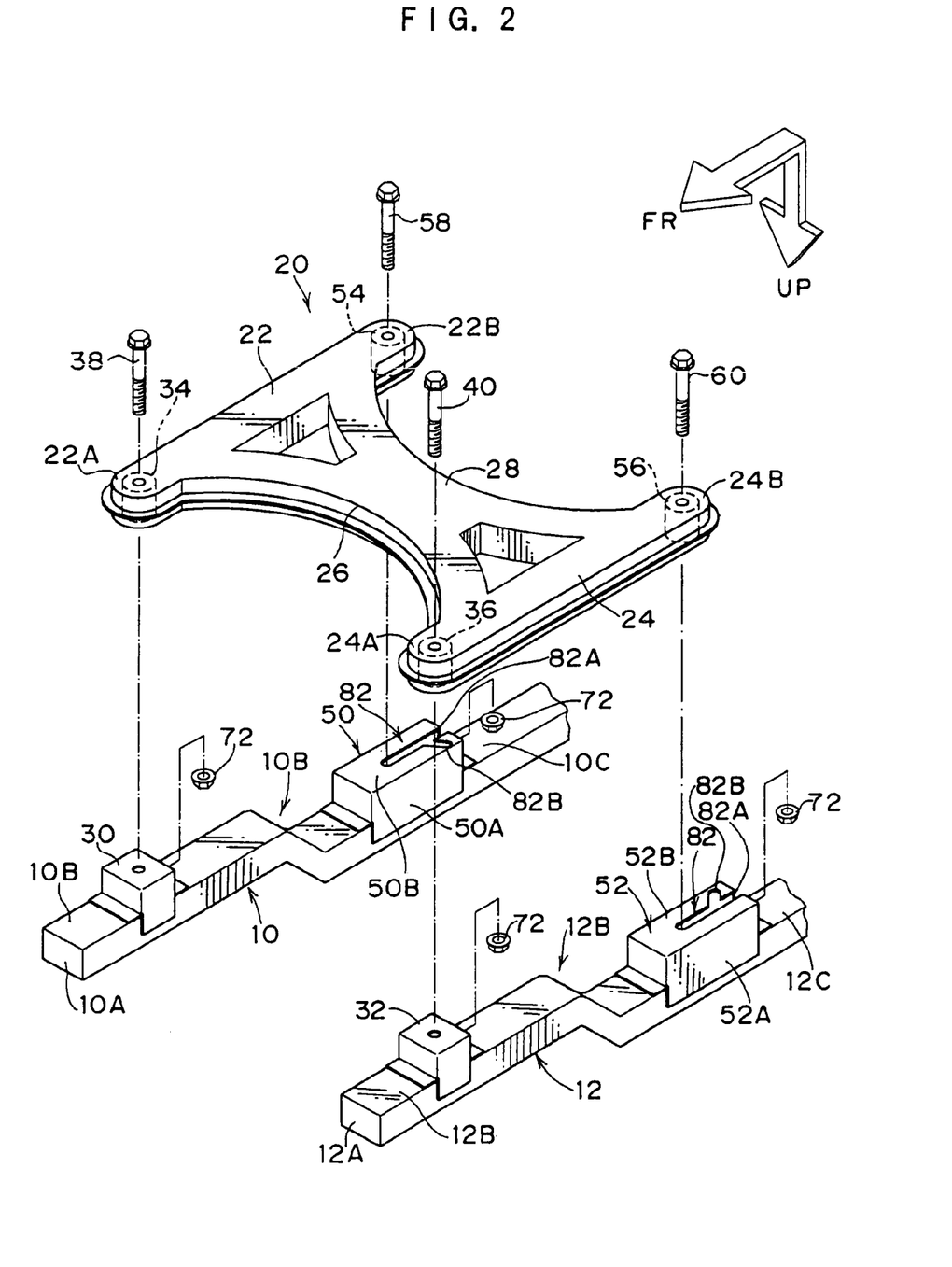
FIG. 2 is an exploded perspective view showing the front body structure of the vehicle, according to the embodiment of the present invention, seen from a lower front side of the vehicle at an angle.

As shown in FIG. 2, the front suspension member 20 is structured such that a front cross member 26 and a rear cross member 28 are suspended between two linear side rails 22, 24 extending along the longitudinal direction of the vehicle. The front cross member 26 is shaped in an arc bulging toward the rear side of the vehicle, in a plan view. The rear cross member 28 is shaped in an arc bulging considerably toward the front side of the vehicle, in a plan view.

Front mounting brackets 30, 32 are respectively disposed on lower surfaces 10B, 12B of the front portions of the pair of right and left front side members 10, 12. Front ends 22A, 24A of the side rails 22, 24 are respectively fixed to the front mounting brackets 30, 32 by bolts 38, 40, which respectively pass through front rubber mounts 34, 36 fitting in the front ends 22A, 24A of the side rails 22, 24.

Rear mounting brackets 50, 52 serving as fixing mechanisms are respectively disposed on lower surfaces 10C, 12C of rear portions of the pair of right and left front side members 10, 12. Rear ends 22B, 24B of the side rails 22, 24 are respectively fixed to the rear mounting brackets 50, 52 by bolts 58, 60, which respectively pass through rear rubber mounts 54, 56 fitting in the rear ends 22B, 24B of the side rails 22, 24.

Figure 3:
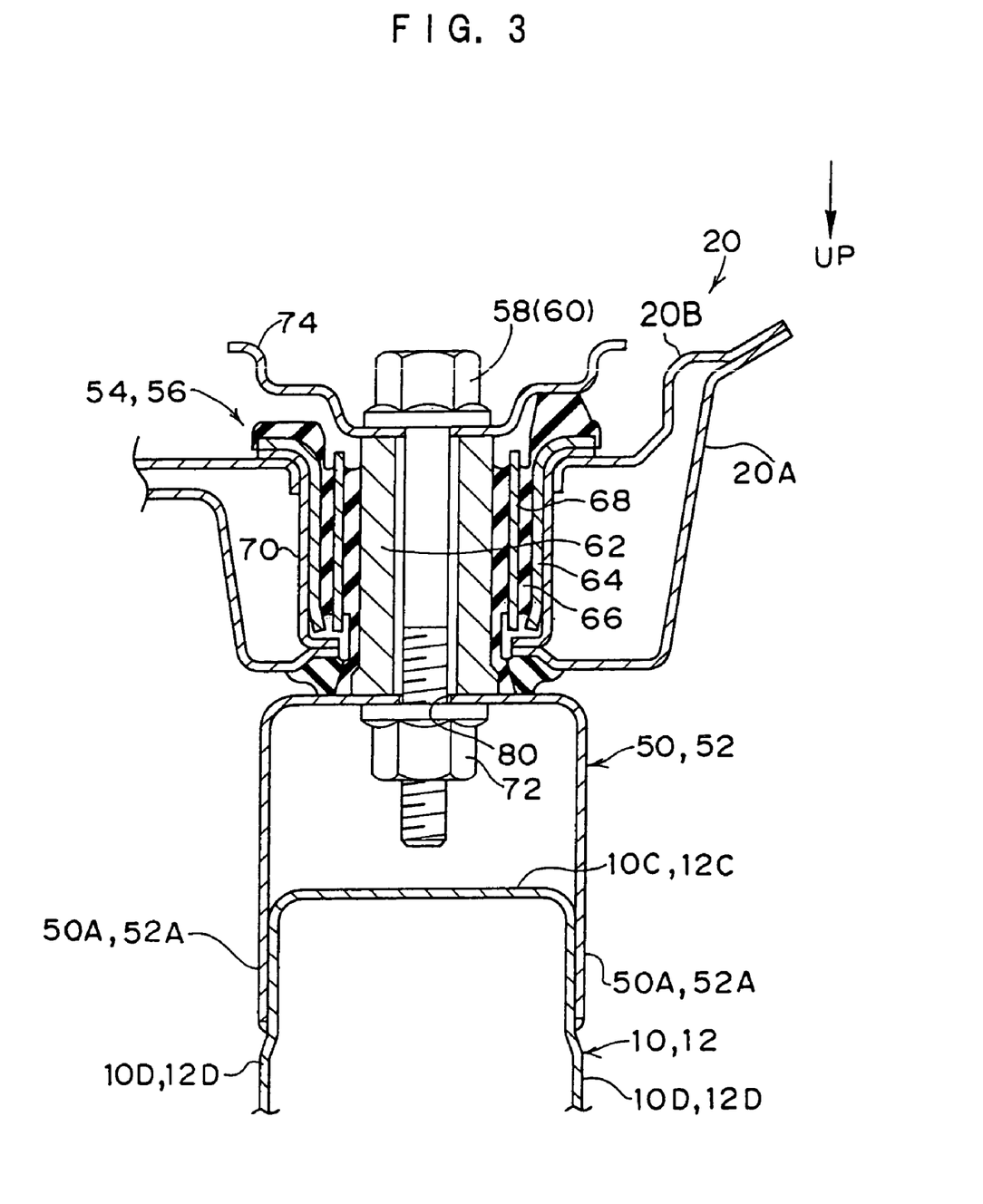
FIG. 3 is an enlarged cross-sectional view seen along Line 3-3 in FIG. 1.

As shown in FIG. 3, each of the rear rubber mounts 54, 56 has a well-known structure in which an inner pipe 62 is connected to an outer ring 64 via an elastic member 66. A center ring 68 for adjusting the spring constant is embedded in the elastic member 66. The front suspension member 20 has a closed cross-sectional structure in which an upper panel 20A and a lower panel 20B are integrally welded. A cup-shaped holder 70, into which the rear rubber mount 54 or 56 can be fit from the lower side of the vehicle (the upper side of FIG. 3), is welded between the upper panel 20A and the lower panel 20B.

Each of the rear mounting brackets 50, 52 is formed by bending a plate member and extends along the longitudinal direction of the vehicle body. The cross-sectional shape of the rear mounting brackets 50, 52 viewed from the longitudinal direction of the vehicle is a squared U-shape whose opening is oriented to the upper side of the vehicle. Upper edges of side walls 50A, 52A are respectively welded to side walls 10D, 12D of the front side members 10, 12.

In FIG. 3, Reference numeral 72 indicates a nut into which the bolt 58 or 60 is screwed, and Reference numeral 74 indicates a washer.

As shown in FIG. 2, slits 82 opening toward the rear side of the vehicle are respectively formed in bottom walls 50B, 52B of the rear mounting brackets 50, 52. Branches 82B (first branches) branching toward the inner rear side of the vehicle are respectively formed near rear-end openings 82A of the slits 82.

Figure 4:
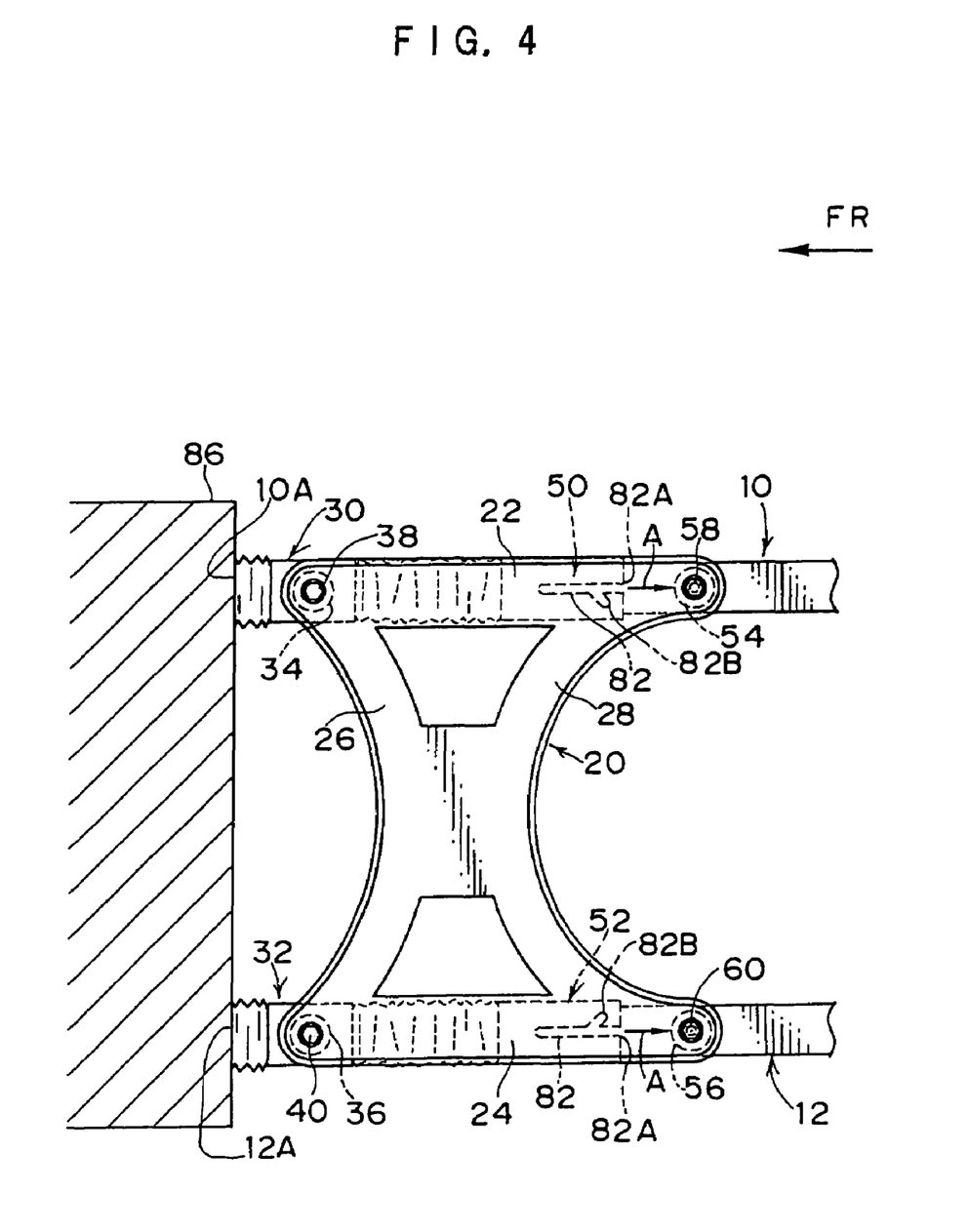
FIG. 4 is a plan view showing a full-lapped collision state of the front body structure of the vehicle, according to the embodiment of the present invention, seen from the lower side of the vehicle.

Thus, as shown in FIG. 4, when the vehicle comes into full-lapped collision with a wall 86 or the like, and the load applied to the right and left front side members 10, 12 from the front side of the vehicle is equal to or more than a predetermined value, the bolts 58, 60 passing through the front suspension member 20 move toward the rear side of the vehicle (in Arrow A direction in FIG. 4) along the slits 82 of the rear mounting brackets 50, 52 disposed on the right and left front side members 10, 12, and then the bolts 58, 60 come off the rear-end openings 82A of the slits 82. Accordingly, the state in which the right and left front side members 10, 12 are fixed to the front suspension member 20 is released.

Figure 5:
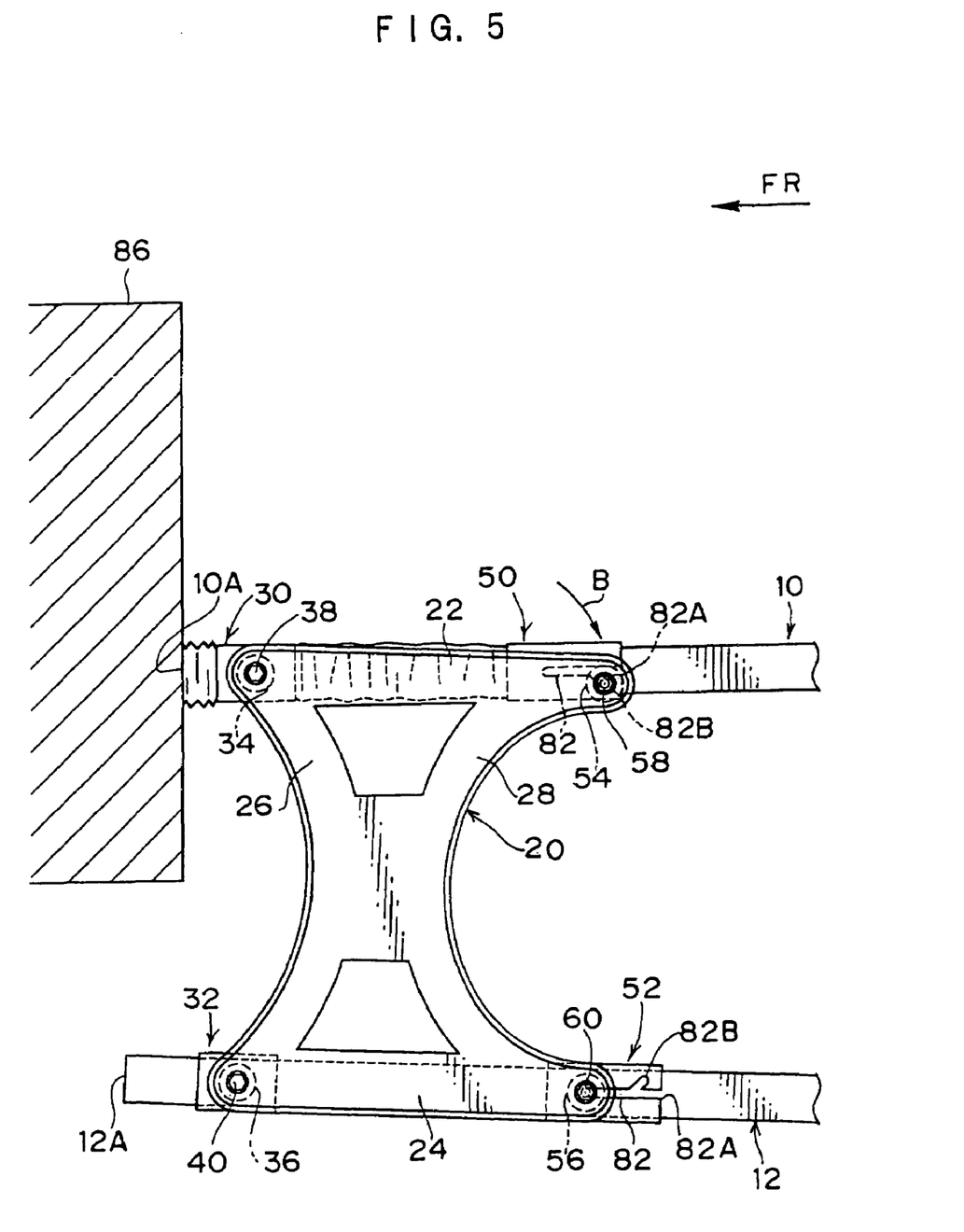
FIG. 5 is a plan view showing an offset collision state of the front body structure of the vehicle, according to the embodiment of the present invention, seen from the lower side of the vehicle.

On the other hand, as shown in FIG. 5, when the vehicle comes into offset collision with the wall 86 or the like, and the load applied to the collided front side member 10 from the front side of the vehicle is equal to or more than a predetermined value, the collided front side member 10 is deformed. Thus, the front suspension member 20 rotates in Arrow B direction in FIG. 5. As a result, the bolt 58 passing through the front suspension member 20 moves toward the rear side of the vehicle along the slit 82 of the rear mounting bracket 50 disposed on the front side member 10, and then the bolt 58 fits into the branch 82B of the slit 82. Accordingly, the state in which the collided front side member 10 is fixed to the front suspension member 20 is maintained.

Next, operation of this embodiment will be described.

In this embodiment, as shown in FIG. 4, when the vehicle comes into full-lapped collision with the wall 86 or the like, and the load applied to the right and left front side members 10, 12 from the front side of the vehicle is equal to or more than a predetermined value, the bolts 58, 60 passing through the front suspension member 20 move toward the rear side of the vehicle (in Arrow A direction in FIG. 4) along the slits 82 of the rear mounting brackets 50, 52 disposed on the right and left front side members 10, 12, and then the bolts 58, 60 come off the rear-end openings 82A of the slits 82. Accordingly, the state in which the right and left front side members 10, 12 are fixed to the front suspension member 20 is released.

Figure 6:
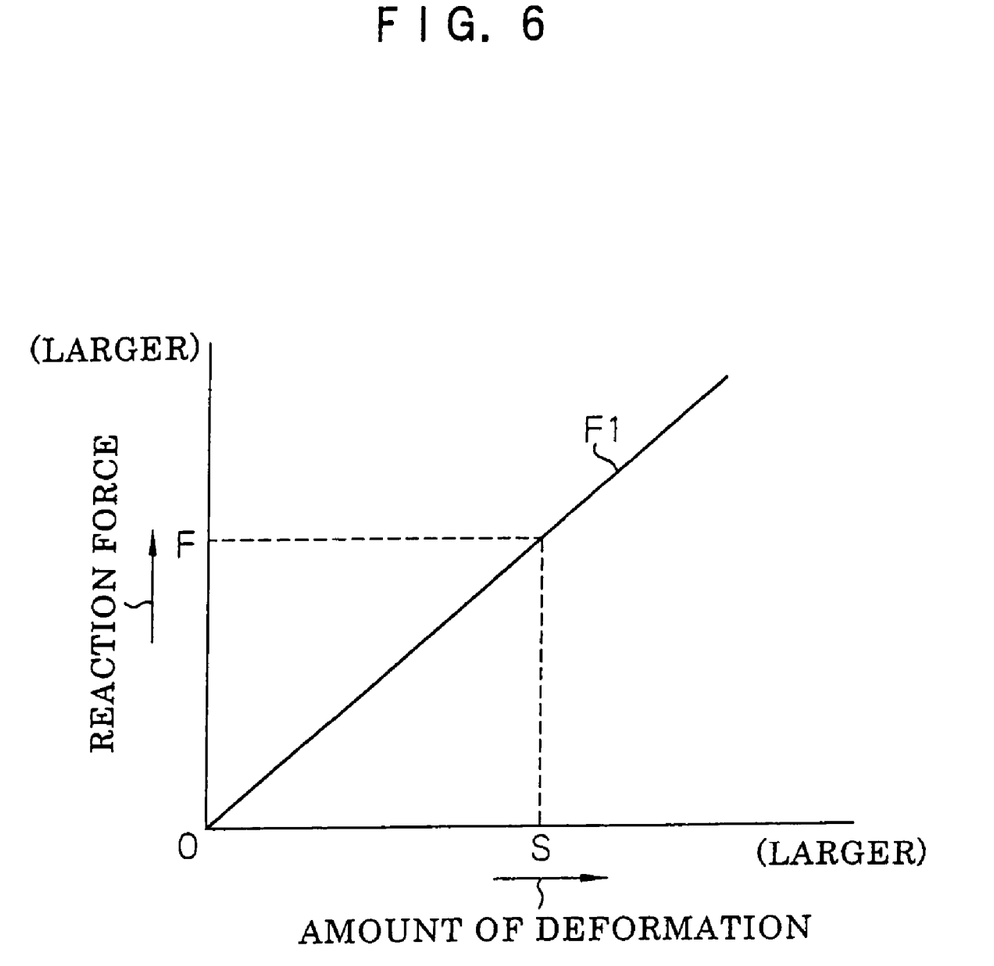
FIG. 6 is a graph showing reaction force characteristics in the full-lapped collision state of the front body structure of the vehicle, according to the embodiment of the present invention.

As a result, the right and left front side members 10, 12 receive the collision load and are deformed so that the impact can be absorbed. Accordingly, when the spring constants of the right and left front side members 10, 12 along the longitudinal direction of the vehicle are respectively determined as K1 and K2, the reaction force at the time of full-lapped collision, F1, is proportional to the deformation stroke S of the right and left front side members 10, 12, i.e., $F1=K1 \cdot S+K2 \cdot S$, as shown in the graph of FIG. 6. When $K1=K2$, then $F1=2 \cdot K1 \cdot S$.

On the other hand, as shown in FIG. 5, when the vehicle comes into offset collision with the wall 86 or the like, and the load applied to the collided front side member 10 from the front side of the vehicle is equal to or more than a predetermined value, the collided front side member 10 is deformed. Thus, the front suspension member 20 rotates in Arrow B direction in FIG. 5. As a result, the bolt 58 passing through the front suspension member 20 fits into the branch 82B of the slit 82 of the rear mounting bracket 50 disposed on the collided front side member 10. Accordingly, the state in which the collided front side member 10 is fixed to the front suspension member 20 is maintained.

As a result, the collided front side member 10 receives a part of the collision load and is deformed so that a part of the impact can be absorbed. In this case, the reaction force on the collided side, F2, is proportional to the deformation stroke S of the collided front side member 10, i.e., F2=K1•S, as shown in the graph of FIG. 7.

In the case of offset collision, since the state in which the collided front side member 10 is fixed to the front suspension member 20 is maintained, the front suspension member 20 receives a part of the collision load and is deformed so that a part of the impact can be absorbed. In this case, when the spring constant of the front suspension member 20 along the longitudinal direction of the vehicle is determined as K3, the reaction force of the front suspension member 20, F3, is proportional to the deformation stroke S, i.e., F3=K3•S.

Further, in the case of offset collision, the reaction force against the rotation of the front suspension member 20, F4, is generated at the other front side member 12, wherein F4=α•S (α is a constant).

Figure 7:
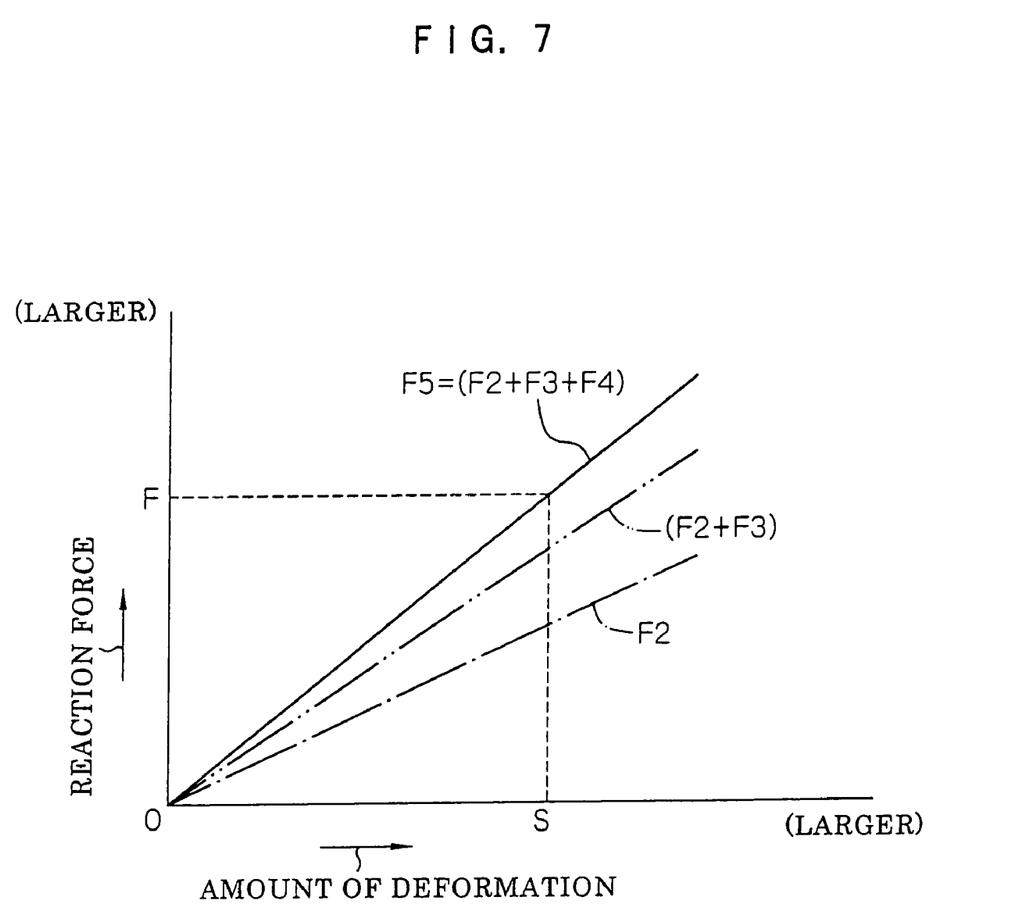
FIG. 7 is a graph showing reaction force characteristics in the offset collision state of the front body structure of the vehicle, according to the embodiment of the present invention.

Accordingly, the total reaction force in the case of offset collision, F5, is proportional to the deformation stroke S of the collided front side member 10, i.e., F5=F2+F3+F4=K1•S+K3•S+α•S, as shown in the graph of FIG. 7.

As a result, since the reaction force at the time of full-lapped collision, F1=2•K1•S, if K3 (the spring constant of the front suspension member 20) and α (the constant of the reaction force against the rotation of the front suspension member 20 in the front side members 10, 12) are adjusted such that K1•S=K3•S+α•S is satisfied, F1 (the reaction force at the time of full-lapped collision) becomes substantially equal to F5 (the total reaction force at the time of offset collision) (i.e., F1≈F5). Thus, even in the case of offset collision, substantially the same impact absorption effect as in the case of full-lapped collision can be obtained.

Accordingly, in this embodiment, satisfactory impact absorption can be achieved both at the time of offset collision and at the time of full-lapped collision.

Further, in this embodiment, since the front suspension member 20 can be used as a connecting member, there is no need to provide a particular connecting member and the structure is thus simplified.

In the above embodiment, the case of elastic deformation has been described by using the spring constants. However, even in the case of deformation due to actual collision, i.e., plastic deformation, the same operation and effect can be achieved.

Figure 8:
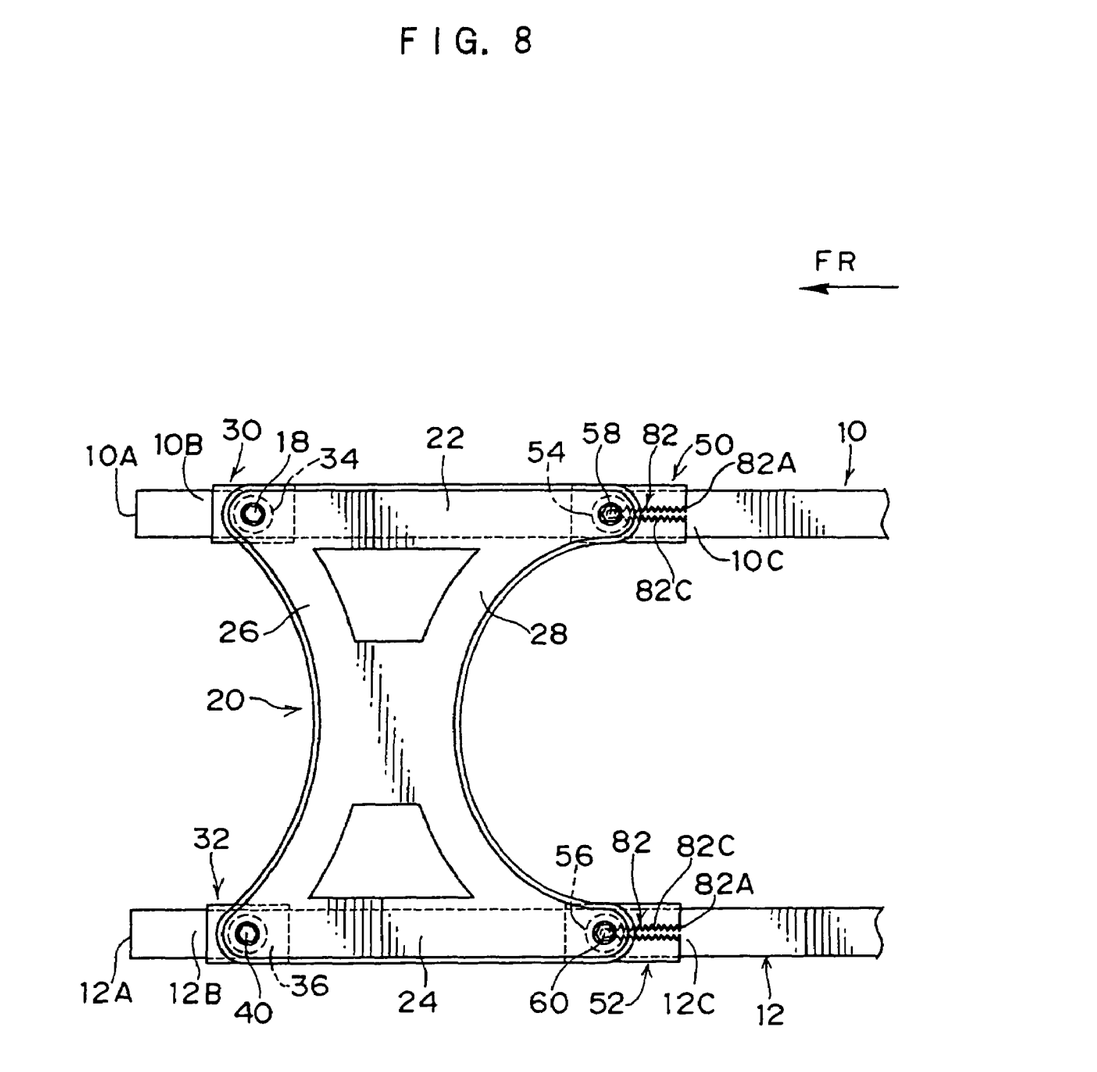
FIG. 8 is a plan view showing a front body structure of a vehicle, according to another embodiment of the present invention, seen from a lower side of the vehicle.

The present invention has been described above in detail with regard to the particular embodiment. However, the present invention is not limited to this embodiment, and it is apparent to those skilled in the art that other various embodiments are possible within the scope of the present invention. For example, in the above embodiment, the bolts 58, 60 are fit into the branches 82B of the slits 82 formed in the rear mounting brackets 50, 52 serving as fixing mechanisms. However, in place of the branches 82B, bolt-movement restraint mechanisms 82C for restraining the movement of the bolts 58, 60, such as irregular surfaces or large friction surfaces, may be formed in inner peripheral surfaces of the slits 82, as shown in FIG. 8.

Figure 9:
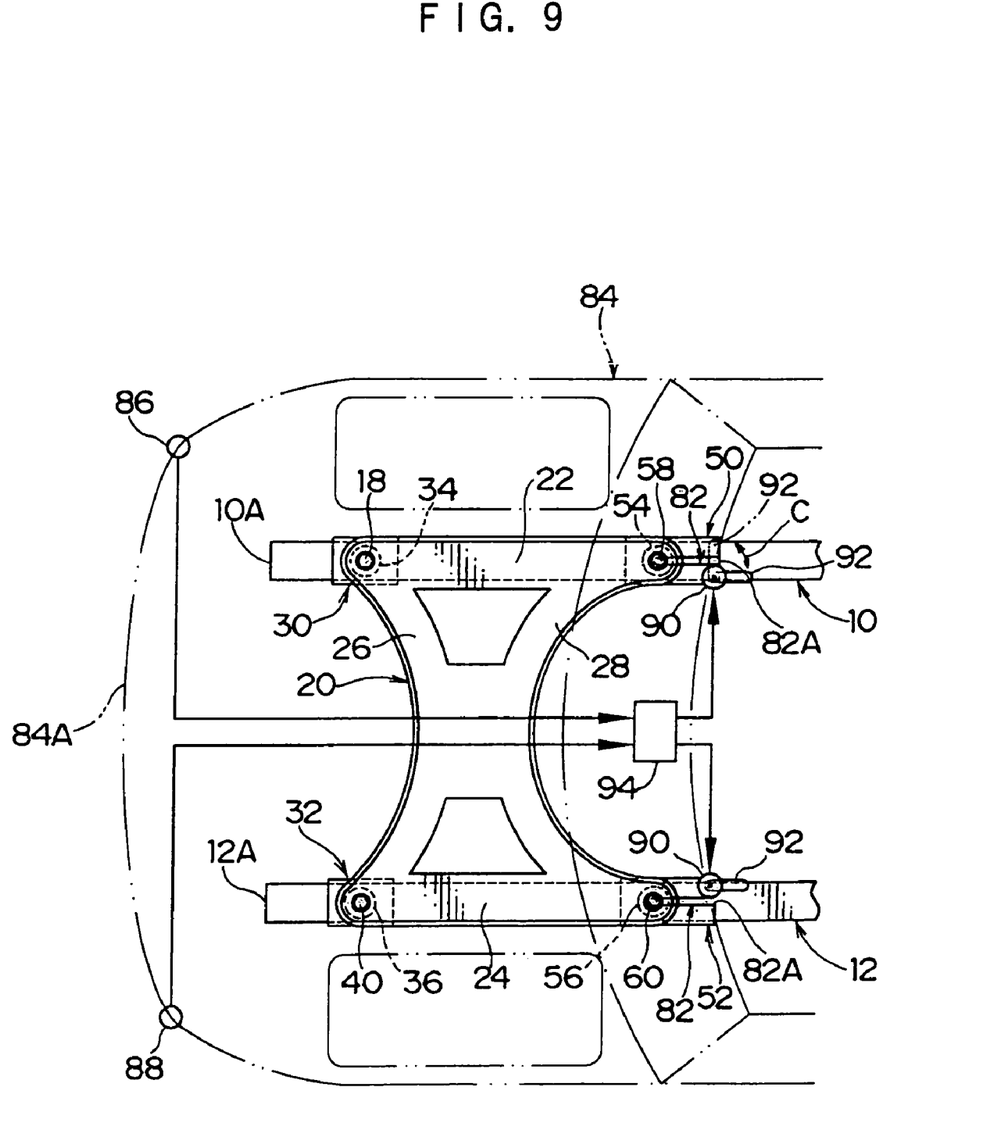
FIG. 9 is a plan view showing a front body structure of a vehicle, according to another embodiment of the present invention, seen from a lower side of the vehicle.

Further, as shown in FIG. 9, collision detection sensors 86, 88 may be respectively disposed near both ends of a front portion 84A of a vehicle body 84 in the transverse direction of the vehicle, and lock bars 92 serving as lock mechanisms, which open and close the opening ends 82A of the slits 82 of the rear mounting brackets 50, 52 due to operation of actuators 90, may be respectively disposed near the opening ends of the slits 82. The actuator 90 of the offset-collided front side member 10 is operated by a controller 94 based on detection signals from the collision detection sensors 86, 88, and the lock bar 92 is thereby rotated in Arrow C direction so as to move from a position where the opening end 82A of the slit 82 is opened (illustrated by solid lines in FIG. 9) to a lock position where the opening end 82A of the slit 82 is closed (illustrated by two-dotted chain lines in FIG. 9).

Figure 10:
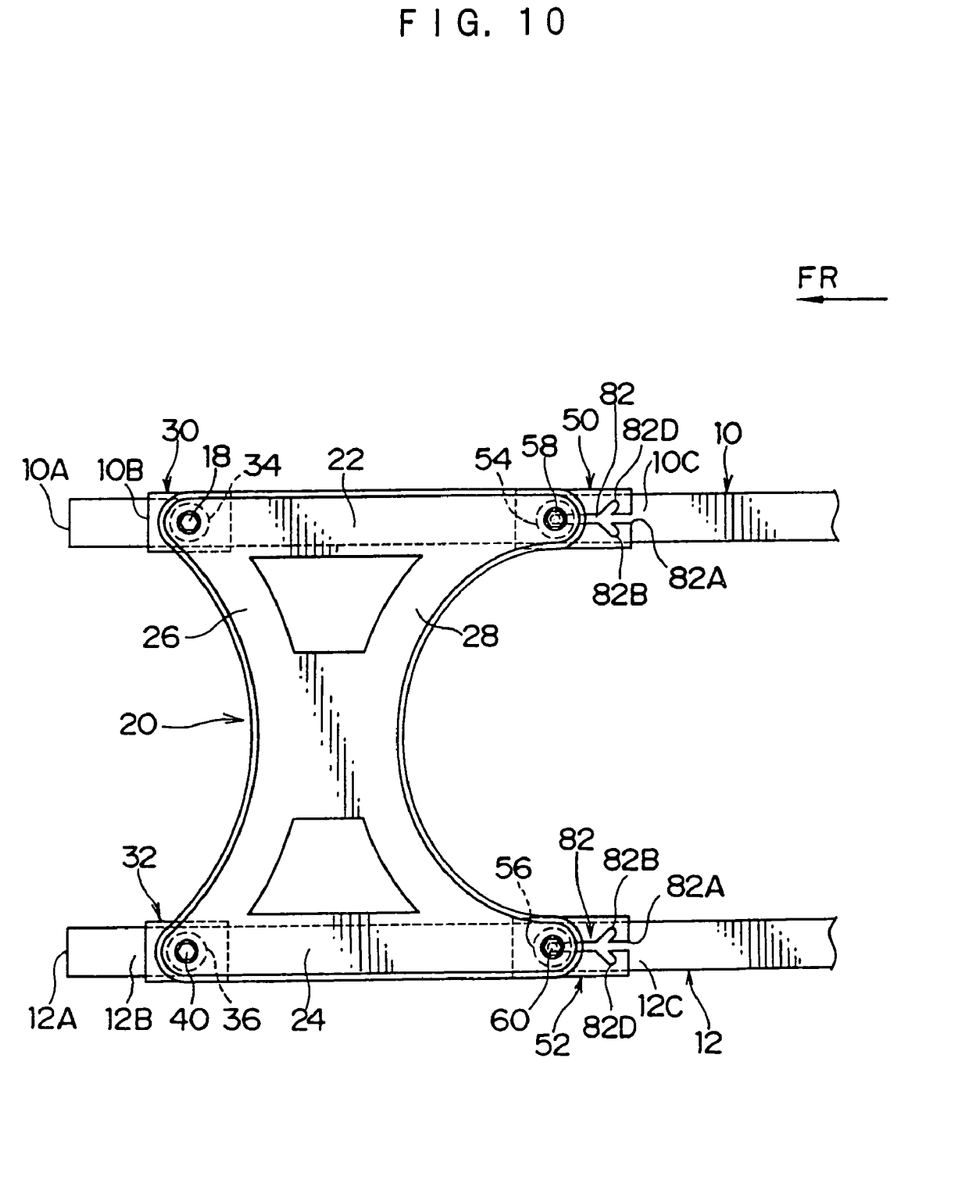
FIG. 10 is a plan view showing a front body structure of a vehicle, according to another embodiment of the present invention, seen from a lower side of the vehicle.

Furthermore, as shown in FIG. 10, the branches 82B branching toward the inner rear sides of the vehicle and branches 82D (second branches) branching toward the outer rear sides of the vehicle may be respectively formed near the rear-end openings 82A of the slits 82. In the event that the bolt 58 has passed through the rear-end opening 82A of the slit 82 in the offset-collided front side member 10, the bolt 60 fits into the branch 82D of the slit 82 in the other front side member 12 so that the impact absorption effect at the time of offset collision can be prevented from being reduced.

In this embodiment, the front suspension member 20 is used as a connecting member. However, the connecting member is not limited to the front suspension member, and may be another member such as a front sub-frame or an engine, or a special member.

INDUSTRIAL APPLICABILITY

As described above, the present invention can provide a front body structure of a vehicle, which has an advantage that satisfactory impact absorption can be achieved both at the time of offset collision and at the time of full-lapped collision.

The invention claimed is:

1. A front body structure of a vehicle, comprising:
   a pair of right and left front side members disposed at a front portion of a vehicle body along a longitudinal direction of the vehicle body;
   a connecting member including a pair of front end and a pair of rear ends in a transverse direction of the vehicle, the the front ends being respectively fixed to front fixing portions and the rear ends being respectively fixed to rear fixing portions of the pair of right and left front side members; and
   fixing mechanisms disposed on the right and left rear fixing portions, the fixing mechanisms releasing, when a load applied to the front side members from a front side of the vehicle is equal to or more than a predetermined value at a time of full-lapped collision, a state in which the front side members are fixed to the connecting member, and maintaining, at a time of offset collision, a state in which the collided front side member is fixed to the connecting member,
   wherein the fixing mechanisms include slits extending parallel to the front side members and first branches branching from vicinities of rear-end openings of the slits toward inner rear sides of the vehicle, and fixing members of the connecting member can move in the slits and the first branches, and
   the first branches are structured such that, at the time of offset collision, the fixing members fixing the connecting member to the collided front side member move and fit into the first branch of the slit.

2. The front body structure of a vehicle of claim 1, wherein the connecting member is a front suspension member.

3. The front body structure of a vehicle of claim 1, wherein the slits further include second branches branching toward outer rear sides of the vehicle.

4. The front body structure of a vehicle of claim 1, wherein the second branches are structured such that, at the time of offset collision, the fixing members fixing the connecting member to the other front side member opposite to the collided front side member move and fit into the second branch of the slit.

5. The front body structure of a vehicle of claim 1, structured such that reaction force of the right and left front side members at the time of full-lapped collision becomes substantially equal to total reaction force at the time of offset collision.

6. The front body structure of a vehicle of claim 5, structured such that, at the time of offset collision, the connecting member receives a part of the collision load the collided front side member receives so that a part of impact can be absorbed.

7. A front body structure of a vehicle, comprising:
a pair of right and left front side members disposed at a front portion of a vehicle body along a longitudinal direction of the vehicle body;
a connecting member including a pair of front ends and a pair of rear ends in a transverse direction of the vehicle, the front ends being respectively fixed to front fixing portions and the rear ends being respectively fixed to rear fixing portions of the pair of right and left front side members; and
fixing mechanisms disposed on the right and left rear fixing portions, the fixing mechanisms releasing, when a load applied to the front side members from a front side of the vehicle is equal to or more than a predetermined value at a time of full-lapped collision, a state in which the front side members are fixed to the connecting member, and maintaining, at a time of offset collision, a state in which the collided front side member is fixed to the connecting member, wherein
the fixing mechanisms include slits which extend parallel to the front side members and in which fixing members of the connecting member can move, and movement restraint mechanisms for restraining movement of the connecting member are formed in inner peripheral surfaces of the slits.

8. A front body structure of a vehicle, comprising:
a pair of right and left front side members disposed at a front portion of a vehicle body alone a longitudinal direction of the vehicle body;
a connecting member including a pair of front ends and a pair of rear ends in a transverse direction of the vehicle, the front ends being respectively fixed to front fixing portions and the rear ends being respectively fixed to rear fixing portions of the pair of right and left front side members; and
fixing mechanisms disposed on the right and left rear fixing portions, the fixing mechanisms releasing, when a load applied to the front side members from a front side of the vehicle is equal to or more than a predetermined value at a time of full-lapped collision, a state in which the front side members are fixed to the connecting member, and maintaining, at a time of offset collision, a state in which the collided front side member is fixed to the connecting member, wherein
the fixing mechanisms include slits which extend parallel to the front side members and in which fixing members of the connecting member can move, and lock mechanisms for opening and closing opening ends are provided near the slits, and at the time of offset collision, the lock mechanism closes the opening end of the slit of the fixing mechanism provided on the collided front side member, based on detection signals from collision detection sensors disposed at a front portion of the vehicle body.

9. A front body structure of a vehicle, comprising:
a pair of right and left front side members disposed at a front portion of a vehicle body along a longitudinal direction of the vehicle body;
a connecting member including a pair of front ends and a pair of rear ends in a transverse direction of the vehicle, the front ends being respectively fixed to front fixing portions and the rear ends being respectively fixed to rear fixing portions of the pair of right and left front side members; and
fixing mechanisms disposed on the right and left rear fixing portions, the fixing mechanisms releasing, when a load applied to the front side members from a front side of the vehicle is equal to or more than a predetermined value at a time of full-lapped collision, a state in which the front side members are fixed to the connecting member, and maintaining, at a time of offset collision, a state in which the collided front side member is fixed to the connecting member, wherein
the fixing mechanisms include slits extending parallel to the front side members and first branches branching from vicinities of rear-end openings of the slits toward inner rear sides of the vehicle, and fixing members of the connecting member can move in the slits and the first branches.

* * * * *